(No Model.)

J. H. MITCHELL.
COLLAPSIBLE SHIPPING CASK.

No. 403,501. Patented May 14, 1889.

WITNESSES:

INVENTOR:
J. H. Mitchell
BY
Munn & Co.
ATTORNEYS

UNITED STATES PATENT OFFICE.

JOHN H. MITCHELL, OF BLOOMFIELD, IOWA.

COLLAPSIBLE SHIPPING-CASK.

SPECIFICATION forming part of Letters Patent No. 403,501, dated May 14, 1889.

Application filed August 25, 1888. Serial No. 283,751. (No model.)

*To all whom it may concern:*

Be it known that I, JOHN H. MITCHELL, of Bloomfield, in the county of Davis and State of Iowa, have invented a new and Improved Collapsible Shipping-Cask, of which the following is a full, clear, and exact description.

This invention relates to cases for shipping goods, and has especial reference to boxes, crates, and barrels termed "knockdown" cases, which can be readily taken apart and put together in unpacking and packing goods, may in this way be in continual use, and can be returned in compact folded shape for a new shipment of goods.

The invention consists in a collapsible shipping-cask constructed and arranged as hereinafter described and claimed.

Reference is to be had to the accompanying drawings, forming a part of this specification, in which similar figures of reference indicate corresponding parts in all the views.

Figure 1:
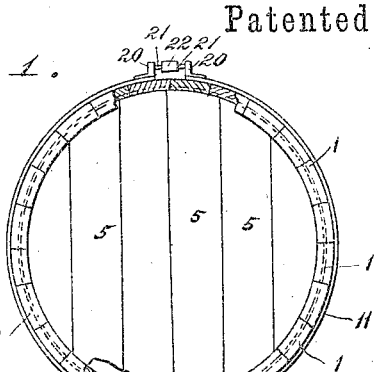
Figure 6:
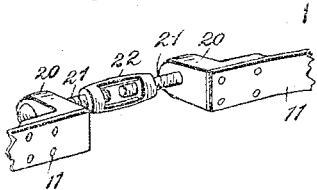
Figure 7:
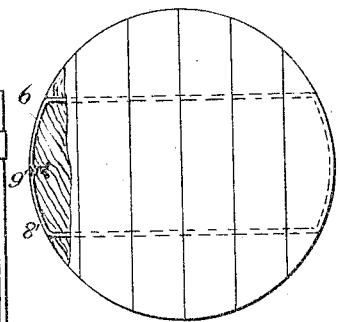
Figure 2:
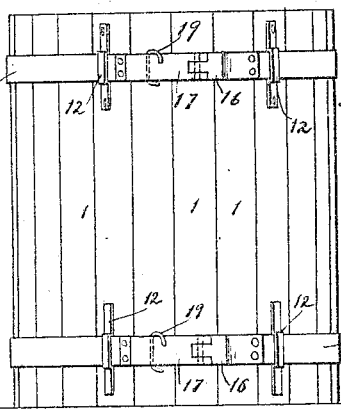
Figure 4:
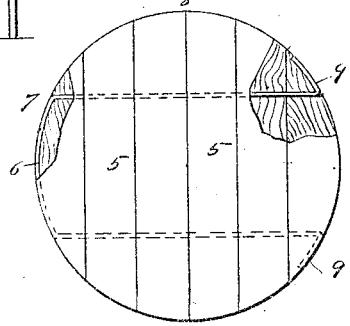
Figure 3:
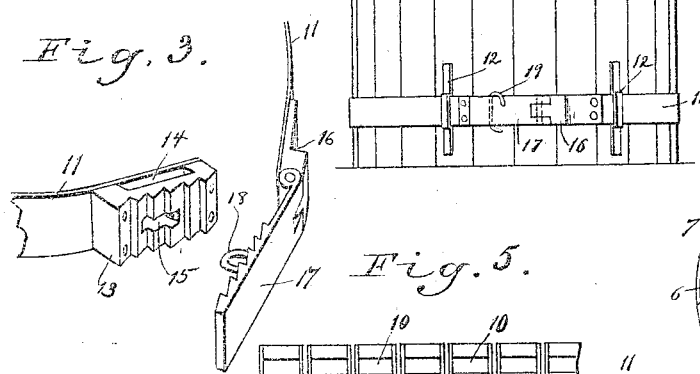
Figure 5:
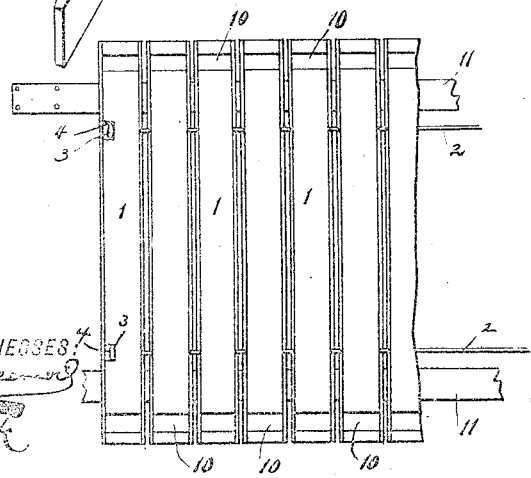

Figure 1 is a plan view of the invention, shown as partly broken away. Fig. 2 is a side view. Fig. 3 is a detail of one of the hoop-fasteners. Fig. 4 is a bottom view of one of the heads of the cask partly broken away. Fig. 5 is a view showing the means for connecting the staves. Fig. 6 is a perspective view of a portion of one of the hoops with adjustable lengthening and shortening device, and Fig. 7 is a view of a head showing modified form of fastening.

In carrying out this invention I connect together a number of staves, 1, of suitable size, by means of wires 2, extending through perforations in the staves, as shown in Fig. 5, and having enlargements 3 on their ends, which are located in recesses 4 in the end staves, so as to be out of the way in putting the cask together and to retain the staves on the wires when the cask is "knocked down." The vertical edges of the staves are formed with a bevel, so that when the cask is put together the edges of the staves will lie close together, as shown in Figs. 1 and 2. The heads of the cask are formed of strips 5, connected together in any suitable manner, and, as shown in Fig. 4, preferably by means of a U-shaped wire, 6, extending through perforations in the strips 5 along a groove, as at 7, in the edge of the head 8, and having its ends bent and lying in grooves in the opposite edge of the head 8, as at 9, or as shown in Fig. 7, with its ends lying in a groove, 8', and twisted together, as at 9'. The staves 1 are formed with grooves 10, adjacent to their top and bottom, to receive the edge of the heads 8. Metallic hoops or bands 11 are secured to the set of wired staves adjacent to their top and bottom by means of clamps 12. The cask is put together by folding the wired staves about the heads 8, the edge of the latter lying in grooves formed by the grooves 10 in the staves.

In order to secure the ends of the bands 11 together, a serrated metallic block, 13, is riveted to one end of the bands 11, having a vertical slot, 14, and a lateral slot, 15, opening into the slot 14. To the other end of the bands 11 is riveted a metallic block, 16, to which is pivoted a serrated plate, 17, having a lateral staple, 18. In use the plate 17 laps over the block 13, their serrations engaging each other, and the staple 18 projects through the slot 15 into the slot 14. By this means the ends of the bands 11 are firmly engaged and are secured by means of a wire, 19, passing through staple 18 and slot 14 and having its ends bent over the plate 17. The fastenings may be locked by applying a seal thereto.

In order to provide for lengthening or shortening the bands 11 and permit the serrated block 13 to engage the serrated plate 17, the bands 11 are formed between their ends with lugs 20, having screw-threaded projections 21, connected by a turn-buckle, 22.

By means of a cask constructed in accordance with this invention a strong, durable, and effective shipping-case is provided, which may be readily put together, as herein described, and can be knocked down by taking off the wires 19 and releasing the fastenings. When transported empty, the heads and wired staves, laid flat, may be compactly laid together for transportation.

Having thus described my invention, what I claim as new, and desire to secure by Letters Patent, is—

1. A collapsible shipping-cask constructed with staves 1, having grooves 10, adjacent to their ends, and wires 2, extending through the staves and secured in recesses 4 in the end staves, heads 8, consisting of strips 5, connected together by a U-shaped wire, 6, extending through the strips 5, and having its ends secured in the edge of the head, the heads 8, resting in the grooves 10 of the staves, metallic bands 11, inclosing staves 1 and secured thereto by clamps 12, with a serrated metallic block, 13, having vertical slot 14 and lateral slot 15, opening thereinto, secured to one end of bands 11, and a metallic block, 16, secured to the other end of the bands 11, with serrated plate 17, pivoted thereto, engaging block 13, and having lateral staple 18, projecting through slot 15 into slot 14, and wire 19, passing through slot 14 and staple 18, with its ends bent over plate 17, substantially as described.

2. The head 8, consisting of strips 5, connected together by U-shaped wire 6, extending through strips 5, and having its folded end resting against one edge of head 8, and its ends bent against the opposite edge, substantially as described.

3. The band 11, having at one end metallic serrated block 13, with vertical slot 14 and lateral slot 15, opening into the same, and at the other end metallic block 16, with serrated plate 17, having staple 18, and pivoted block 16, substantially as described.

4. The band 11, having at one end metallic serrated block 13, with vertical slot 14 and lateral slot 15, opening into the same, and at the other end metallic block 16, with serrated plate 17, having staple 18, and pivoted to block 16, and joined between its ends by the lugs 20, having screw-threaded projections 21, with turn-buckle 22, substantially as described.

5. The staves 1, with grooves 10, adjacent to their ends, and wires 2, extending through staves 1 and secured in recesses 4 in the end staves, and metallic bands 11, secured to staves 1, with serrated metallic block 13 at one end having vertical slot 14 and lateral slot 15, opening thereinto, and the block 16 at the other end, with serrated plate 17, having staple 18 and pivoted to block 16, substantially as described.

JOHN H. MITCHELL.

Witnesses:
WILLIAM S. MITCHELL,
ANDREW W. SHELTON.